US012317209B2

(12) United States Patent
Liang et al.

(10) Patent No.: US 12,317,209 B2
(45) Date of Patent: May 27, 2025

(54) COMMUNICATION METHOD OF ELECTRONIC SHELF LABEL SYSTEM, SYSTEM, COMPUTER DEVICE AND STORAGE MEDIUM

(71) Applicant: Hanshow Technology Co., Ltd., Zhejiang (CN)

(72) Inventors: Min Liang, Zhejiang (CN); Yaping Ji, Zhejiang (CN); Gengfeng Chen, Zhejiang (CN); Guofeng Zhang, Zhejiang (CN); Yujing Wang, Zhejiang (CN); Ju Zhang, Zhejiang (CN); Qi Jiang, Zhejiang (CN)

(73) Assignee: HANSHOW TECHNOLOGY CO., LTD., Jiaxing (CN)

( * ) Notice: Subject to any disclaimer, the term of this patent is extended or adjusted under 35 U.S.C. 154(b) by 0 days.

(21) Appl. No.: 18/637,203

(22) Filed: Apr. 16, 2024

(65) Prior Publication Data

US 2025/0056441 A1 Feb. 13, 2025

(30) Foreign Application Priority Data

Aug. 10, 2023 (CN) .......................... 202311006499.2

(51) Int. Cl.
*H04W 56/00* (2009.01)
(52) U.S. Cl.
CPC ............................. *H04W 56/0015* (2013.01)
(58) Field of Classification Search
CPC ................................................ H04W 56/0015
See application file for complete search history.

(56) References Cited

U.S. PATENT DOCUMENTS

2011/0207501 A1  8/2011  Moriya et al.
2011/0211512 A1  9/2011  Kimura et al.
(Continued)

FOREIGN PATENT DOCUMENTS

CN        103491632 A    1/2014
CN        104735774 A    6/2015
(Continued)

OTHER PUBLICATIONS

International Searching Authority, "International Search Report," issued in connection with International Patent Application No. PCT/CN2022/104622, dated Sep. 28, 2022, 8 pages. [English translation provided].

(Continued)

*Primary Examiner* — Ayanah S George
(74) *Attorney, Agent, or Firm* — Hanley, Flight & Zimmerman, LLC

(57) ABSTRACT

The present disclosure provides a communication method of an electronic shelf label system, a system, a computer device and a storage medium. The method includes: configuring, by a server, an offset of each of base stations in a corresponding synchronization sub-network based on neighboring relationships between all the base stations in each of the synchronization sub-networks, so that each of the base stations calculates synchronization frame transmission time in a predetermined signal transmission cycle based on the offset; calculating, by each of the base stations, idle time in a synchronization channel based on the synchronization frame transmission time, so that each of the base stations receives a target synchronization frame sent by a superior base station in the idle time of the synchronization channel. According to the present disclosure, the synchronization frames sent by all the base stations has central and adjacent feature in time.

20 Claims, 5 Drawing Sheets

(56) References Cited

U.S. PATENT DOCUMENTS

| | | | |
|---|---|---|---|
| 2011/0305294 A1 | | 12/2011 | Moriya et al. |
| 2015/0034719 A1* | | 2/2015 | Wei .................. H04W 72/0453 |
| | | | 235/383 |
| 2016/0198393 A1 | | 7/2016 | Li |
| 2018/0098296 A1 | | 4/2018 | Wang et al. |
| 2018/0334703 A1 | | 11/2018 | Feng et al. |
| 2019/0335479 A1 | | 10/2019 | Thubert et al. |
| 2021/0093624 A1 | | 4/2021 | Zhu |
| 2021/0247402 A1 | | 8/2021 | Sakrikar et al. |
| 2023/0344721 A1* | | 10/2023 | Ji ........................... H04L 41/12 |

FOREIGN PATENT DOCUMENTS

| | | | | | |
|---|---|---|---|---|---|
| CN | 105636937 | A | | 6/2016 | |
| CN | 107773761 | A | | 3/2018 | |
| CN | 110361491 | A | | 10/2019 | |
| CN | 110567780 | A | | 12/2019 | |
| CN | 110602660 | A | | 12/2019 | |
| CN | 111208219 | A | | 5/2020 | |
| CN | 111665303 | A | | 9/2020 | |
| CN | 111812223 | A | | 10/2020 | |
| CN | 111954296 | A | | 11/2020 | |
| CN | 112105004 | A | * | 12/2020 | ......... G06K 17/0029 |
| CN | 112136046 | A | | 12/2020 | |
| CN | 113163485 | A | | 7/2021 | |
| CN | 113395753 | A | | 9/2021 | |
| CN | 110602660 | B | | 10/2021 | |
| CN | 114554399 | A | | 5/2022 | |
| CN | 115623435 | A | | 1/2023 | |
| CN | 115802477 | A | | 3/2023 | |
| CN | 116456449 | A | | 7/2023 | |
| ES | 2387294 | A1 | | 9/2012 | |
| JP | 2000324535 | A | | 11/2000 | |
| JP | 201057128 | A | | 3/2010 | |
| JP | 201499903 | A | | 5/2014 | |
| JP | 2018521528 | A | | 8/2018 | |
| WO | 2010084843 | A1 | | 7/2010 | |
| WO | 2018229682 | A1 | | 12/2018 | |
| WO | 2019237725 | A1 | | 12/2019 | |

OTHER PUBLICATIONS

International Searching Authority, "Written Opinion," issued in connection with International Patent Application No. PCT/CN2022/104622, dated Sep. 28, 2022, 7 pages. [English translation provided].

International Bureau, "International Preliminary Report on Patentability," issued in connection with International Patent Application No. PCT/CN2022/104622, dated Feb. 27, 2024, 8 pages. [English translation provided].

Li et al., "Development of an LC—MS/MS method for determination of 2-oxo-clopidogrel in human plasma," Journal of Pharmaceutical Analysis, vol. 5, No. 1, Jul. 17, 2014, 6 pages.

Jung et al., "Direct measurement of active thiol metabolite levels of clopidogrel in human plasma using tris(2-carboxyethyl)phosphine as a reducing agent by LC-MS/MS," Journal of Separation Science vol. 36, No. 14, May 18, 2013, 9 pages.

Canadian Patent Office, "First Office Action," issued in connection with Canadian Patent Application No. 3,234,986, dated May 3, 2024, 5 pages.

Japanese Patent Office, "Notice of Reason for Refusal," issued in connection with Japanese Patent Application No. 2024-064072, dated Jul. 9, 2024, 3 pages. [English machine translation provided].

European Patent Office, "Extended European Search Report," issued in connection with European Patent Application No. 24169888.5, dated Nov. 15, 2024, 7 pages.

International Searching Authority, "International Search Report," issued in connection with International Patent Application No. PCT/CN2024/105964, dated Sep. 24, 2024, 3 pages.

China National Intellectual Property Administration, "First Search Report," issued in connection with Chinese Patent Application No. 202311006499.2, dated Sep. 20, 2023, 6 pages. [English machine translation provided].

Du et al., "The Design and Implementation of Electronic Tag System," Telecom Power Technology, vol. 33, No. 2, dated Mar. 25, 2016, 3 pages. [English abstract provided].

IP Australia, "Examination Report No. 1", issued in connection with AU Patent Application No. 2024202281 on Jan. 14, 2025, 7 pages.

* cited by examiner

COMMUNICATION METHOD OF ELECTRONIC SHELF LABEL SYSTEM, SYSTEM, COMPUTER DEVICE AND STORAGE MEDIUM

CROSS-REFERENCE TO RELATED APPLICATIONS

This application claims priority to Chinese Patent Application No. 202311006499.2, filed on Aug. 10, 2023, which is hereby incorporated by reference in its entirety.

TECHNICAL FIELD

The present disclosure relates to the technical field of communications, and particularly to a communication method of an electronic shelf label system, a system, a computer device and a storage medium.

BACKGROUND

The electronic shelf label is an electronic display device placed on a shelf to replace the traditional paper shelf label. Each of the electronic shelf labels (ESL) is connected to a computer database of a shopping mall via a wired or wireless network, and a latest commodity price is displayed on a screen of the electronic shelf label. The electronic shelf label system is a network system including a plurality of wireless base stations.

The communication network of the existing electronic shelf label system is an asynchronization network, i.e., all the WirelessAccess Points (base stations) are not synchronized with each other. Although the asynchronization network has a simple design, a low requirement for the timing devices and a low requirement for the circuit design, the communication method based on the asynchronization network has the problem of mutual interferences when a plurality of base stations need to work in parallel due to limited channel resources, which reduces the communication stability of the electronic shelf label system.

SUMMARY

Aiming at the disadvantages of the prior art, the present disclosure provides a communication method of an electronic shelf label system, a system, a computer device and a storage medium, all of which solve the problem that in the communication method of the electronic shelf label system in the prior art, a plurality of base stations interfere with each other when they are working in parallel. The present disclosure constructs at least one synchronization sub-network based on a network topological structure between the base stations and a determined maximum capacity number of base stations in each of the synchronization sub-networks, allocates synchronization frame time in a synchronization channel for each of the base stations based on an offset of each of the base stations in the corresponding synchronization sub-network, so that the synchronization frames sent by all the base stations has central and adjacent feature in time, which not only ensures that each of the base stations has its synchronization frame transmission time and data transmission time and prevents the plurality of base stations from interfering with each other when they are working in parallel, but also shortens a frame listening cycle of the electronic shelf label and reduce a power consumption thereof.

In a first aspect, the present disclosure provides a communication method of an electronic shelf label system comprising a server, a plurality of base stations and a plurality of electronic shelf labels, the method including: determining, by the server, a maximum capacity number of base stations in each of synchronization sub-networks, based on a predetermined signal transmission cycle and a synchronization frame transmission duration; constructing, by the server, at least one synchronization sub-network including the plurality of base stations, based on a network topological structure between the base stations and the maximum capacity number of base stations; configuring, by the server, an offset of each of the base stations in the corresponding synchronization sub-network based on neighboring relationships between all the base stations in each of the synchronization sub-networks, so that each of the base stations calculates synchronization frame transmission time in the predetermined signal transmission cycle based on the offset, and a start moment of sending a synchronization frame by a base station with an offset of i is an end moment of sending a synchronization frame by a base station with an offset of i−1 in a same synchronization sub-network, and a maximum offset in the same synchronization sub-network is a sum of the number of actual base stations and M; and calculating, by each of the base stations, idle time in a synchronization channel, based on the synchronization frame transmission time, so that each of the base stations receives a target synchronization frame sent by a superior base station in the idle time of the synchronization channel, and each of the base stations adjusts local synchronization frame transmission time thereof based on a time offset of the target synchronization frame, and each of the base stations has the idle time in the synchronization channel and data frame transmission time in a data channel overlap with each other.

Optionally, after calculating, by each of the base stations, idle time in a synchronization channel, based on the synchronization frame transmission time, so that each of the base stations receives a target synchronization frame sent by a superior base station in the idle time of the synchronization channel, the method further includes: randomly sending, by an electronic shelf label in an out-of-step state, a synchronization request in the synchronization channel, so that a base station that receives the synchronization request sends a synchronization response signal; calculating, by the electronic shelf label in the out-of-step state, a windowing time period in which synchronization frames of all the base stations are received in the synchronization channel, based on the synchronization response signal; and obtaining, by the electronic shelf label in the out-of-step state, a synchronization base station, based on signal intensities of all the synchronization frames received in the windowing time period, and the electronic shelf label in the out-of-step state enters a synchronization state based on a synchronization frame of the synchronization base station.

Optionally, calculating, by the electronic shelf label in the out-of-step state, a windowing time period in which synchronization frames of all the base stations are received in the synchronization channel, based on the synchronization response signal includes: calculating, by the electronic shelf label in the out-of-step state, a windowing start moment, based on a time offset for a base station with an offset of n in the synchronization response signal from a next transmission of synchronization frames; calculating, by the electronic shelf label in the out-of-step state, a windowing end moment, based on a maximum offset included in the synchronization response signal; and obtaining, by the electronic shelf label in the out-of-step state, a windowing time period in which synchronization frames of all the base stations are received in the synchronization channel, based on the windowing start moment and the windowing end moment.

Optionally, calculating, by the electronic shelf label in the out-of-step state, a windowing start moment, based on a time offset for a base station with an offset of n in the synchronization response signal from a next transmission of synchronization frames includes a calculation formula configured to calculate the windowing start moment:

$$T_{k0}=(T_x+\text{offset})-n*t$$

where, $T_{k0}$ represents a windowing start moment, n represents an offset in the synchronization response signal, $T_x$ represents a moment of reception of the synchronization response signal by the electronic shelf label in the out-of-step state, offset represents a time offset in the synchronization response signal, ($T_x$+offset) represents a start moment of sending a synchronization frame by the base station with an offset of n, and t represents a synchronization frame transmission duration.

Optionally, calculating, by the electronic shelf label in the out-of-step state, a windowing end moment, based on a maximum offset included in the synchronization response signal includes a calculation formula configured to calculate the windowing start moment:

$$T_{k1}=(T_x+\text{offset})+(N-n)*t$$

where, $T_{k1}$ represents a windowing end moment, N represents a maximum offset in the synchronization sub-network where the base station with an offset of n is located, n represents an offset in the synchronization response signal, $T_x$ represents a moment of reception of the synchronization response signal by the electronic shelf label in the out-of-step state, offset represents a time offset in the synchronization response signal, and t represents a synchronization frame transmission duration.

Optionally, after calculating, by each of the base stations, idle time in a synchronization channel, based on the synchronization frame transmission time, so that each of the base stations receives a target synchronization frame sent by a superior base station in the idle time of the synchronization channel, the method further includes: transmitting, by an electronic shelf label in an out-of-step state, an out-of-step heartbeat in the synchronization channel, so that at least one base station receiving the out-of-step heartbeat sends the out-of-step heartbeat and signal intensities of the received out-of-step heartbeat to the server; controlling, by the server, a first target base station which receives the out-of-step heartbeat with maximum signal intensity to transmit an asynchronization broadcast in an asynchronization channel; calculating, by the electronic shelf label in the out-of-step state, a windowing time period in which synchronization frames of all the base stations are received in the synchronization channel, based on an offset of sending moment of synchronization frames in a latest predetermined signal transmission cycle included in the asynchronization broadcast; and obtaining, by the electronic shelf label in the out-of-step state, a synchronization base station, bade on signal intensities of all the synchronization frames received in the windowing time period; and entering a synchronization state based on a synchronization frame of the synchronization base station.

Optionally, the electronic shelf label is in a sleep state at the time other than that of receiving a synchronization frame, sending a synchronization request, receiving a synchronization response signal, receiving a data frame, sending an out-of-step heartbeat and receiving an asynchronization broadcast and a windowing time period.

Optionally, the synchronization frame includes a synchronization frame number, an offset of the base station, an indication bit regarding whether there is a data frame in a current predetermined signal transmission cycle, a channel for transmitting the data frame in the current predetermined signal transmission cycle, and a packet sequence number in the frame of the synchronization frame.

Optionally, the method further includes: when a base station has a data frame to be sent in a next predetermined signal transmission cycle, selecting, by the base station or the server, a target channel from an idle data channel pool as a data channel for the base station to transmit the data frame; configuring the target channel in a transmission synchronization frame of the next predetermined signal transmission cycle, and enabling a plurality of electronic shelf labels synchronized with the base station to receive the data frame in the target channel; and releasing, by the base station, the target channel into the idle data channel pool, based on a transmission requirement of the data frame.

Optionally, after calculating, by each of the base stations, idle time in a synchronization channel based on the synchronization frame transmission time, the method further includes: receiving, by a base station in an out-of-step state, synchronization frames sent by other base stations in a same store within a time period exceeding the predetermined signal transmission cycle under the control of the server; obtaining, by the server, a target synchronization sub-network to be networked based on signal intensities of all the synchronization frames received by the base station in the out-of-step state; allocating, by the server, a target offset for the base station in the out-of-step state based on an idle offset in the target synchronization sub-network, and allocating a superior base station for the base station in the out-of-step state based on a network topological structure in the target synchronization sub-network; and joining, by the base station in the out-of-step state, the target synchronization sub-network based on the target offset and a synchronization frame sent by the superior base station.

Optionally, allocating, by the server, a target offset for the base station in the out-of-step state based on an idle offset in the target synchronization sub-network includes: judging, by the server, whether there is a first idle offset between a minimum offset and a maximum offset in the target synchronization sub-network, and when there is a first idle offset, allocating the first idle offset to the base station in the out-of-step state.

Optionally, the method further includes: when there is no first idle offset, judging whether the maximum offset is equal to the maximum capacity number minus 1; and when the maximum offset is not equal to the maximum capacity number minus 1, allocating a second idle offset obtained by adding the maximum offset with 1 to the base station in the out-of-step state.

In a second aspect, the present disclosure provides an electronic shelf label system, including a server, a plurality of base stations and a plurality of electronic shelf labels; the server is configured to determine a maximum capacity number of base stations in each of synchronization sub-networks based on a predetermined signal transmission cycle and a synchronization frame transmission duration; the server is configured to construct at least one synchronization sub-network including the plurality of base stations based on a network topological structure between the base stations and the maximum capacity number of base stations; the server is configured to configure an offset of each of the base stations in the corresponding synchronization sub-network based on neighboring relationships between all the base stations in each of the synchronization sub-networks, so that each of the base stations calculates synchronization frame transmission time in the predetermined signal transmission cycle based on the offset, and a start moment of sending a synchronization frame by a base station with an offset of i is an end moment of sending a synchronization frame by a base station with an offset of i−1 in a same synchronization sub-network, and a maximum offset in the same synchronization sub-network is a sum of the number of actual base stations and M; and each of the base stations is configured to calculate idle time in a synchronization channel, based on the synchronization frame transmission time, so that each of the base stations receives a target synchronization frame sent by a superior base station in the idle time of the synchronization channel, and each of the base stations is configured to adjust local synchronization frame transmission time thereof based on a time offset of the target synchronization frame; and each of the base stations has the idle time in the synchronization channel and data frame transmission time in a data channel overlap with each other.

In this embodiment, the electronic shelf label is configured to wake up in a frame listening cycle to receive a synchronization frame sent by a synchronization base station, and adjust local time based on the synchronization frame.

In a third aspect, the present disclosure provides a computer device, including a memory, a processor and a computer program stored in the memory and executable on the processor, and when executing the computer program, the processor implements the steps of: determining, by the server, a maximum capacity number of base stations in each of synchronization sub-networks, based on a predetermined signal transmission cycle and a synchronization frame transmission duration; constructing, by the server, at least one synchronization sub-network including the plurality of base stations based on a network topological structure between the base stations and the maximum capacity number of base stations; configuring, by the server, an offset of each of the base stations in the corresponding synchronization sub-network based on neighboring relationships between all the base stations in each of the synchronization sub-networks, so that each of the base stations calculates synchronization frame transmission time in the predetermined signal transmission cycle based on the offset, and a start moment of sending a synchronization frame by a base station with an offset of i is an end moment of sending a synchronization frame by a base station with an offset of i−1 in a same synchronization sub-network, and a maximum offset in the same synchronization sub-network is a sum of the number of actual base stations and M; and calculating, by each of the base stations, idle time in a synchronization channel based on the synchronization frame transmission time, so that each of the base stations receives a target synchronization frame sent by a superior base station in the idle time of the synchronization channel, and each of the base stations adjusts local synchronization frame transmission time thereof based on a time offset of the target synchronization frame, and each of the base stations has the idle time in the synchronization channel and data frame transmission time in a data channel overlap with each other.

In a fourth aspect, the present disclosure provides a readable storage medium on which a computer program is stored, and when being executed by a processor, the computer program implements the steps of: determining, by the server, a maximum capacity number of base stations in each of synchronization sub-networks, based on a predetermined signal transmission cycle and a synchronization frame transmission duration; constructing, by the server, at least one synchronization sub-network including the plurality of base stations based on a network topological structure between the base stations and the maximum capacity number of base stations; configuring, by the server, an offset of each of the base stations in the corresponding synchronization sub-network based on neighboring relationships between all the base stations in each of the synchronization sub-networks, so that each of the base stations calculates synchronization frame transmission time in the predetermined signal transmission cycle based on the offset, and a start moment of sending a synchronization frame by a base station with an offset of i is an end moment of sending a synchronization frames by a base station with an offset of i−1 in a same synchronization sub-network, and a maximum offset in the same synchronization sub-network is a sum of the number of actual base stations and M; and calculating, by each of the base stations, idle time in a synchronization channel based on the synchronization frame transmission time, so that each of the base stations receives a target synchronization frame sent by a superior base station in the idle time of the synchronization channel, and each of the base stations adjusts local synchronization frame transmission time thereof based on a time offset of the target synchronization frame, and each of the base stations has the idle time in the synchronization channel and data frame transmission time in a data channel overlap with each other.

Compared with the prior art, the present disclosure has the following advantageous effects:

1. The present disclosure constructs at least one synchronization sub-network based on a network topological structure between the base stations and a determined maximum capacity number of base stations in each of the synchronization sub-networks; allocates synchronization frame time in a synchronization channel for each of the base stations based on an offset of each of the base stations in the corresponding synchronization sub-network to receive a synchronization frame of a superior base station in idle time of the synchronization channel, and data transmission time of a data channel; and dynamically adjusts local synchronization frame transmission time based on the synchronization frame sent by the superior base station, so that all the base stations in the electronic shelf label system are kept in a synchronization state, and each of the base stations has its synchronization frame transmission time, synchronization frame reception time and data transmission time, thereby effectively preventing the problem that a plurality of base stations interfere with each other when they are working in parallel.

2. The present disclosure takes a start moment of sending synchronization frames by a base station with an offset of i as an end moment of transmission of synchronization frames by a base station with an offset of i−1 in a same synchronization sub-network, i.e., there is no vacancy among the offsets allocated to all the base stations as far as possible, so that the synchronization frames sent by all the base stations has central and adjacent feature in time, thereby shortening the frame listening cycle of the electronic shelf label, so that the electronic shelf label may find the best synchronization base station in a short time to quickly realize a synchronization with a low power consumption. Further, the electronic shelf label may also be quickly switched to a new target base station with a low power consumption during movement.
3. The base station in the present disclosure can flexibly select a new channel for data transmission every time, thereby achieving more flexible frequency hopping to avoid various interferences in the network.

DETAILED DESCRIPTION

In order that the objectives, technical solutions and advantages of the embodiments of the present disclosure are clearer, the technical solutions in the embodiments of the present disclosure will be illustrated clearly and completely below with reference to the drawings for the embodiments of the present disclosure. Obviously, those described are a part, rather than all, of the embodiments of the present disclosure. Based on the embodiments in the present disclosure, any other embodiment obtained by those of ordinary skill in the art without creative work are within the protection scope of the present disclosure.

In a first aspect, the present disclosure provides a communication method of an electronic shelf label system, which specifically includes the following embodiments.

Embodiment 1

Figure 1:
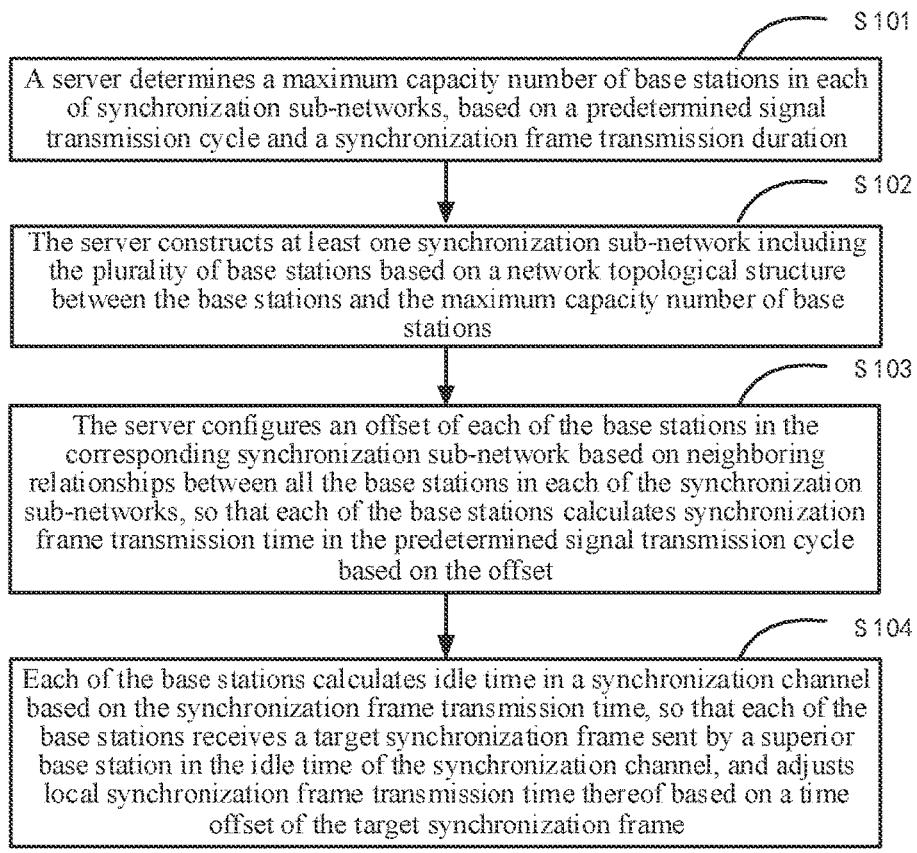
FIG. 1 illustrates a flowchart of a communication method of an electronic shelf label system according to an embodiment of the present disclosure.

FIG. 1 illustrates a flowchart of a communication method of an electronic shelf label system according to an embodiment of the present disclosure. As illustrated in FIG. 1, the communication method specifically includes:

Step S101: a server determines a maximum capacity number of base stations in each of synchronization sub-networks, based on a predetermined signal transmission cycle and a synchronization frame transmission duration.

Figure 2:
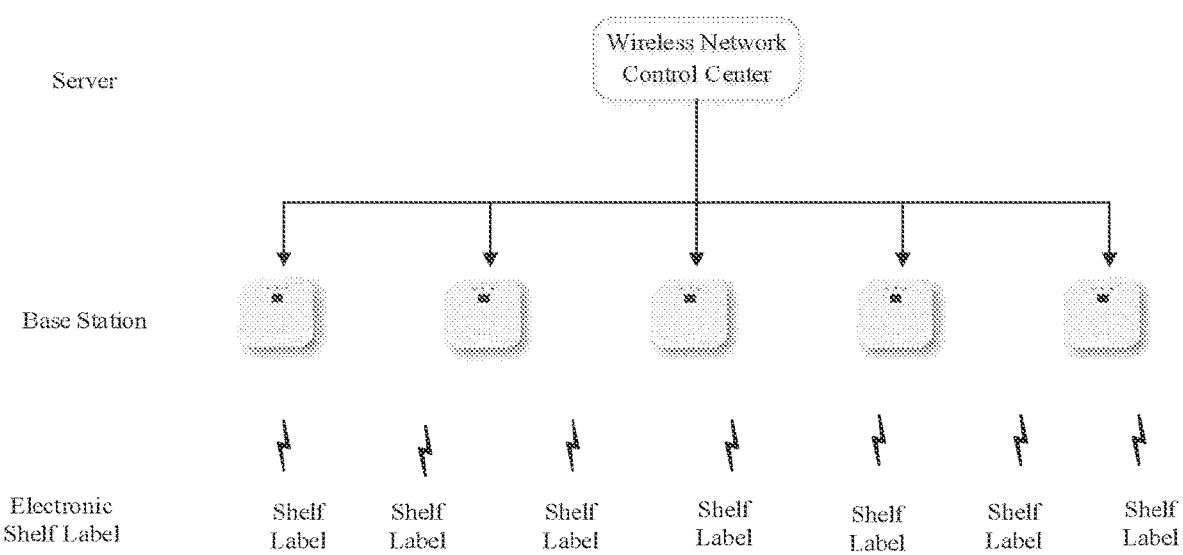
FIG. 2 illustrates a structural diagram of an electronic shelf label system according to an embodiment of the present disclosure.

In this embodiment, as shown in FIG. 2, the electronic shelf label system includes a server, a plurality of base stations and a plurality of electronic shelf labels. The server sends control signals or business data signals to the electronic shelf labels via the base stations, so that the electronic shelf labels perform corresponding operations or update corresponding display contents. The electronic shelf label system in this embodiment communicates based on a synchronization network, and the 'shelf label' in FIG. 2 means an electronic shelf label.

Figure 3:
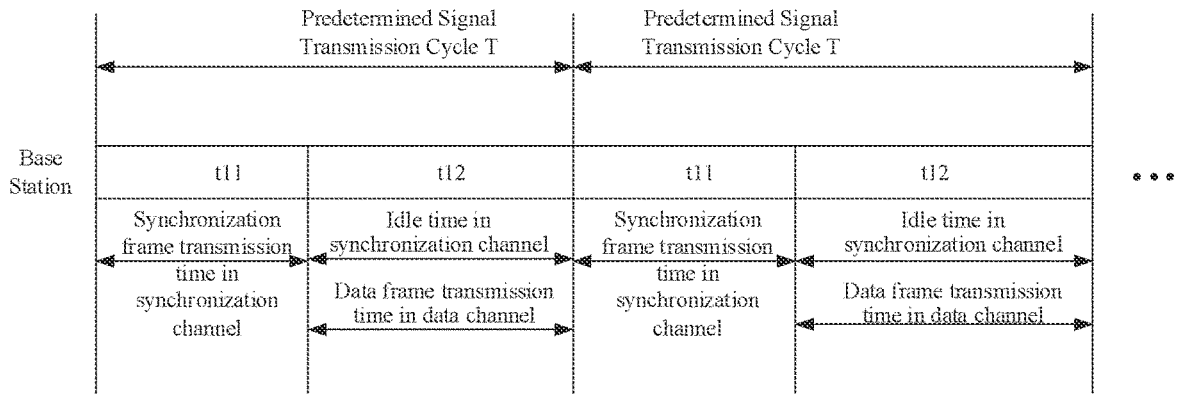
FIG. 3 illustrates a time sequence diagram of a predetermined signal transmission cycle according to an embodiment of the present disclosure.

In this embodiment, as shown in FIG. 3, for each of the base stations, the predetermined signal transmission cycle T includes a synchronization frame transmission time t11 in a synchronization channel of the base station and an idle time t12 in the synchronization channel, and the idle time t12 in the synchronization channel is also the data frame transmission time t12 in a data channel of the base station, and the data channel is different from the synchronization channel. It should be noted that the synchronization frame transmission time t11 in this embodiment is a synchronization frame transmission duration, the idle time t12 is an idle duration, and the data frame transmission time t12 is a data frame transmission duration, and the base station may repeatedly send a same synchronization frame within the synchronization frame transmission time t11 of the synchronization channel, but each of the synchronization frames has a different packet sequence number. When receiving the synchronization frame signal, the shelf label only needs to receive one of synchronization frame data packets, and a start point of a time window for the base station to send the synchronization frame can be calculated based on the packet sequence number and a synchronization packet length, thereby realizing an accurate synchronization.

By dividing the predetermined signal transmission cycle T by the synchronization frame transmission duration t11, a maximum capacity number of base stations sending the synchronization frames end to end within one predetermined signal transmission cycle T is calculated, i.e., a maximum capacity number of base stations in a same synchronization sub-network is calculated. In this embodiment, the synchronization network including a plurality of base stations may also include a plurality of synchronization sub-networks, and a maximum capacity number of each synchronization sub-networks is determined based on the predetermined signal transmission cycle and the synchronization frame transmission duration.

Step S102: the server constructs at least one synchronization sub-network including the plurality of base stations based on a network topological structure between the base stations and the maximum capacity number of base stations.

It should be noted that, based on the network topological structure between the base stations, the server organizes the base stations into one or more synchronization sub-networks, each synchronization sub-networks is an independent synchronization network and includes a master base station and a plurality of secondary base stations; a subordinate base station directly connected to the master base station is taken as a first-level secondary base station, and so on, and a subordinate base station connected to an $j^{th}$-level auxiliary base station is taken as an $(j+1)^{th}$-level secondary base station, $j \geq 1$; and the number of base stations in each of the synchronization sub-networks is less than or equal to the maximum capacity number of base stations. As for how to establish one or more synchronization sub-networks based on the network topological structure between the base stations could be referred to the prior art.

Step S103: the server configures an offset of each of the base stations in the corresponding synchronization sub-network based on neighboring relationships between all the base stations in each of the synchronization sub-networks, so that each of the base stations calculates synchronization frame transmission time in the predetermined signal transmission cycle based on the offset.

In the embodiment, the offset of the base station in the synchronization sub-network is a sequence for the base station to transmit the synchronization frame in the synchronization sub-network, e.g., a base station with an offset of 0 transmits the synchronization frames firstly in the current predetermined signal transmission cycle. Each of the base stations calculates the synchronization frame transmission time in the predetermined signal transmission cycle based on the offset by the following calculation formula: corresponding offset time position=offset of the base station*synchronization frame transmission duration.

Figure 4:
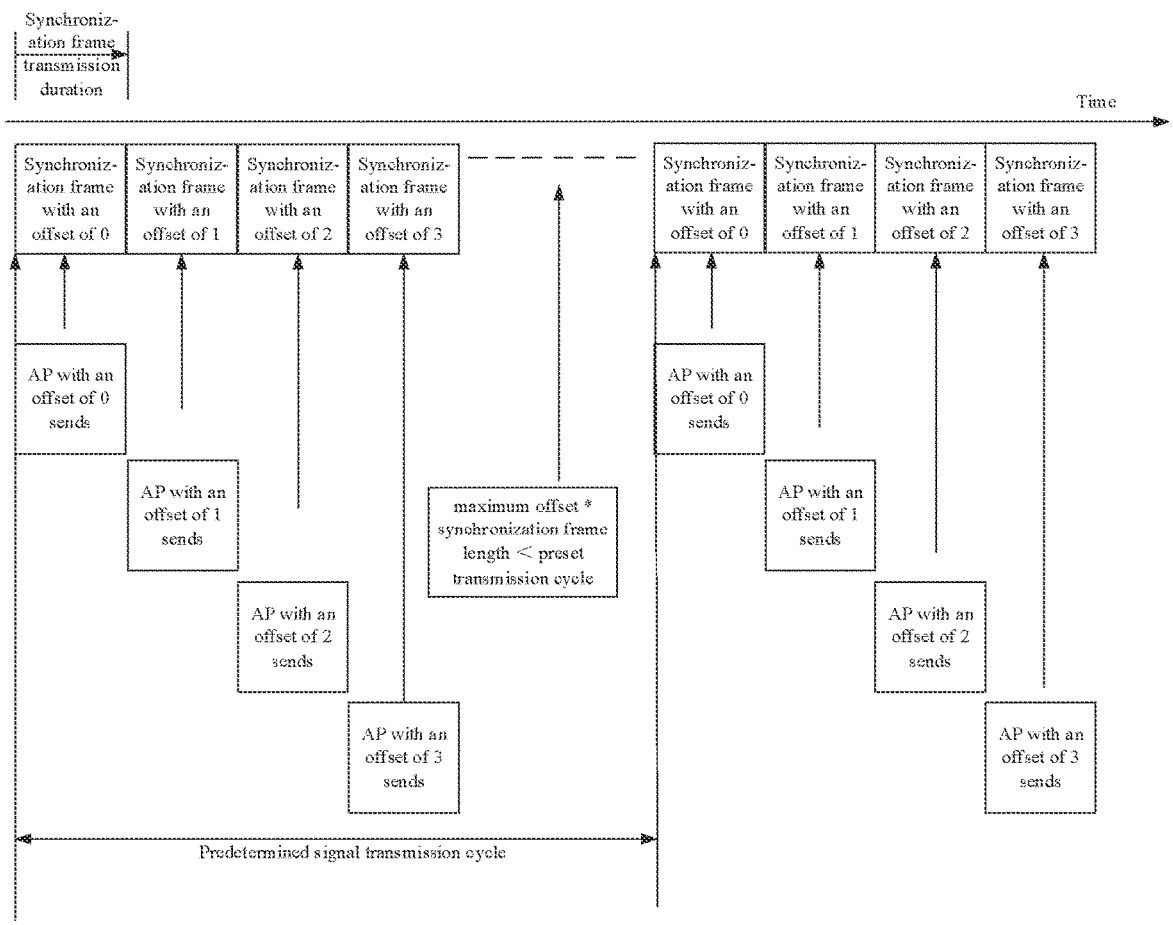
FIG. 4 illustrates a time sequence relationship diagram of synchronization frame transmission time of all the base stations in a same synchronization sub-network according to an embodiment of the present disclosure.

As illustrated in FIG. 4, during the initial configuration for the base station offset, a plurality of base stations with adjacent positions also have adjacent and continuous offset configurations, and the offsets are sequentially allocated from 0 to N to the base stations in each of the synchronization sub-networks, so that there is no vacancy among the offsets allocated to all the base stations, and the synchronization frames transmitted by all the base stations has central and adjacent feature in time, i.e., a start moment of sending a synchronization frame by a base station with an offset of i is an end moment of sending a synchronization frame by a base station with an offset of i−1 in a same synchronization sub-network. Thus, it is possible to not only ensure that each of the base stations has its synchronization frame transmission time and prevent the plurality of base stations from interfering with each other when they are working in parallel, but also shorten the frame listening cycle of the electronic shelf label and reduce the power consumption thereof. Further, a maximum offset in the same synchronization sub-network is a sum of the number of actual base stations and M, where M may be any integer such as −1, 0, 1, 2 or the like, i.e., the maximum offset is approximate to a total number of actual base stations as much as possible. If the total number of actual base stations is 10, the offset is defined as 0 to 9 or 1 to 10, so as to facilitate the management of the base station offset. Even if there is a vacancy between two offsets, it is only a few vacancies, and if a new base station joins, an offset of the vacancy will be preferentially allocated to the new base station. The value of M should be as small as possible, generally less than or equal to 2, so as to ensure that the time of sending synchronization frames by any base station in the same sub-network is in a front part of one predetermined transmission cycle.

Step S104: each of the base stations calculates idle time in a synchronization channel based on the synchronization frame transmission time, so that each of the base stations receives a target synchronization frame sent by a superior base station in the idle time of the synchronization channel; and adjusts local synchronization frame transmission time thereof based on a time offset of the target synchronization frame.

Figure 5:
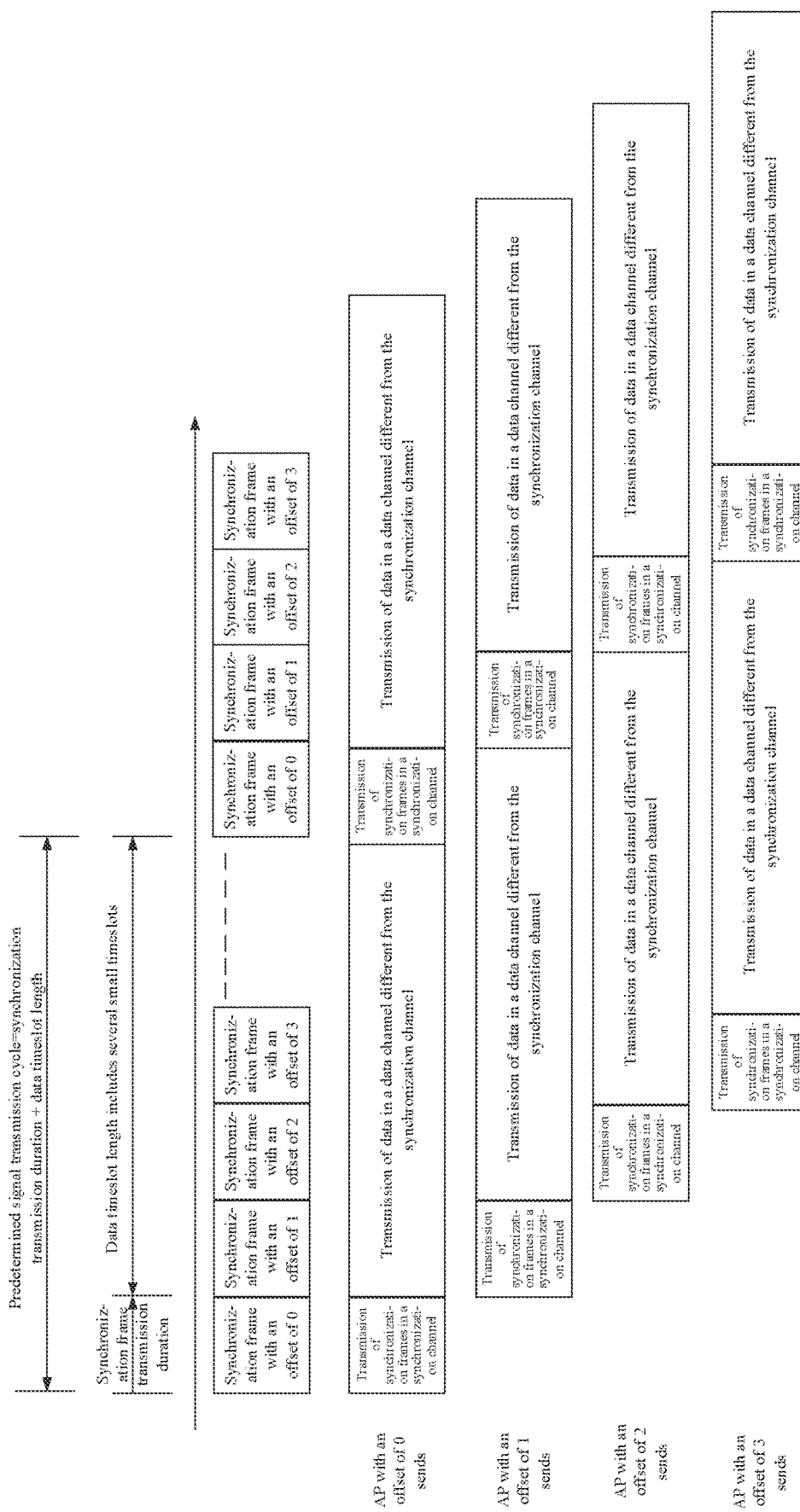
FIG. 5 illustrates a time sequence relationship diagram of synchronization frame transmission time and data frame transmission time of all the base stations in a same synchronization sub-network according to an embodiment of the present disclosure.

In this embodiment, for each of the base stations in the electronic shelf label system, as illustrated in FIG. 5, in a predetermined signal transmission cycle, any duration except the synchronization frame transmission time is idle time of the synchronization channel, and each of the base stations has the idle time in the synchronization channel and data frame transmission time in a data channel overlap with each other. Each of the base stations receives a synchronization frame sent by a superior base station in the idle time of the same synchronization sub-network, and dynamically adjusts local synchronization frame transmission time thereof based on a time offset in the synchronization frame, so as to keep each of the base stations in the synchronization network in a synchronization state.

Further, for each of the electronic shelf labels in the electronic shelf label system, due to the limitation of the capacity of the battery in the shelf label, in order to reduce the power consumption and prolong the life of the battery, it is necessary for the electronic shelf label to stay in a sleep state for a long time, and merely wake up regularly to receive the synchronization frame or the data frame from the base station, which is called as a frame listening cycle. When waking up automatically and receiving the synchronization frame sent by the base station communicated therewith, the electronic shelf label dynamically adjusts the local time thereof based on the time offset in the synchronization frame, so as to keep the electronic shelf label in synchronization with the base stations in the synchronization sub-network.

It should be noted that within a synchronization frame time window, the base station repeatedly sends synchronization frame data packets, possibly for H times. The receiving time point where the shelf label is scheduled to wake up is aligned with an $I^{th}$ packet, where I is less than H. If the actual reception by the shelf label is not, but may be less than, the $I^{th}$ packet, the shelf label adjusts the duration of the next sleep to compensate for the time difference, expecting that the next reception will also be aligned with the $I^{th}$ packet. Of course, if the shelf label is synchronized with the base station with an offset of i, the synchronization frame actually received during the wakeup is the synchronization frame of the base station with an offset of i−1, and the shelf label temporarily sleeps for a short time based on this result, and then align with the transmission time window of the base station with an offset of i to receive the synchronization frame data packets again. If actually receiving the synchronization frames of the base station with an offset of i+1, the shelf label sleeps for a time (the predetermined cycle minus the synchronization frame length) based on this result, and when waking up the next time, the shelf label will receive the next synchronization frame transmission signal of the base station with an offset of i.

Compared with the prior art, the embodiment has the following advantageous effects:

The present disclosure constructs at least one synchronization sub-network based on a network topological structure between the base stations and a determined maximum capacity number of base stations in each of the synchronization sub-networks; allocates synchronization frame time in a synchronization channel for each of the base stations based on an offset of each of the base stations in the corresponding synchronization sub-network to receive a synchronization frame of a superior base station in idle time of the synchronization channel, and data transmission time of a data channel; and dynamically adjusts local synchronization frame transmission time based on the synchronization frame sent by the superior base station, so that all the base stations in the electronic shelf label system are kept in a synchronization state, and each of the base stations has its synchronization frame transmission time, synchronization frame reception time and data transmission time, thereby effectively preventing the problem that a plurality of base stations interfere with each other when they are working in parallel.

Further, a start moment of sending a synchronization frame by a base station with an offset of i is an end moment of sending synchronization frames by a base station with an offset of i−1 in a same synchronization sub-network, i.e., there is no vacancy among the offsets allocated to all the base stations as far as possible, so that the synchronization frames sent by all the base stations has central and adjacent feature in time, which can shorten the frame listening cycle of the electronic shelf label and reduce the power consumption thereof.

Embodiment 2

Figure 6:
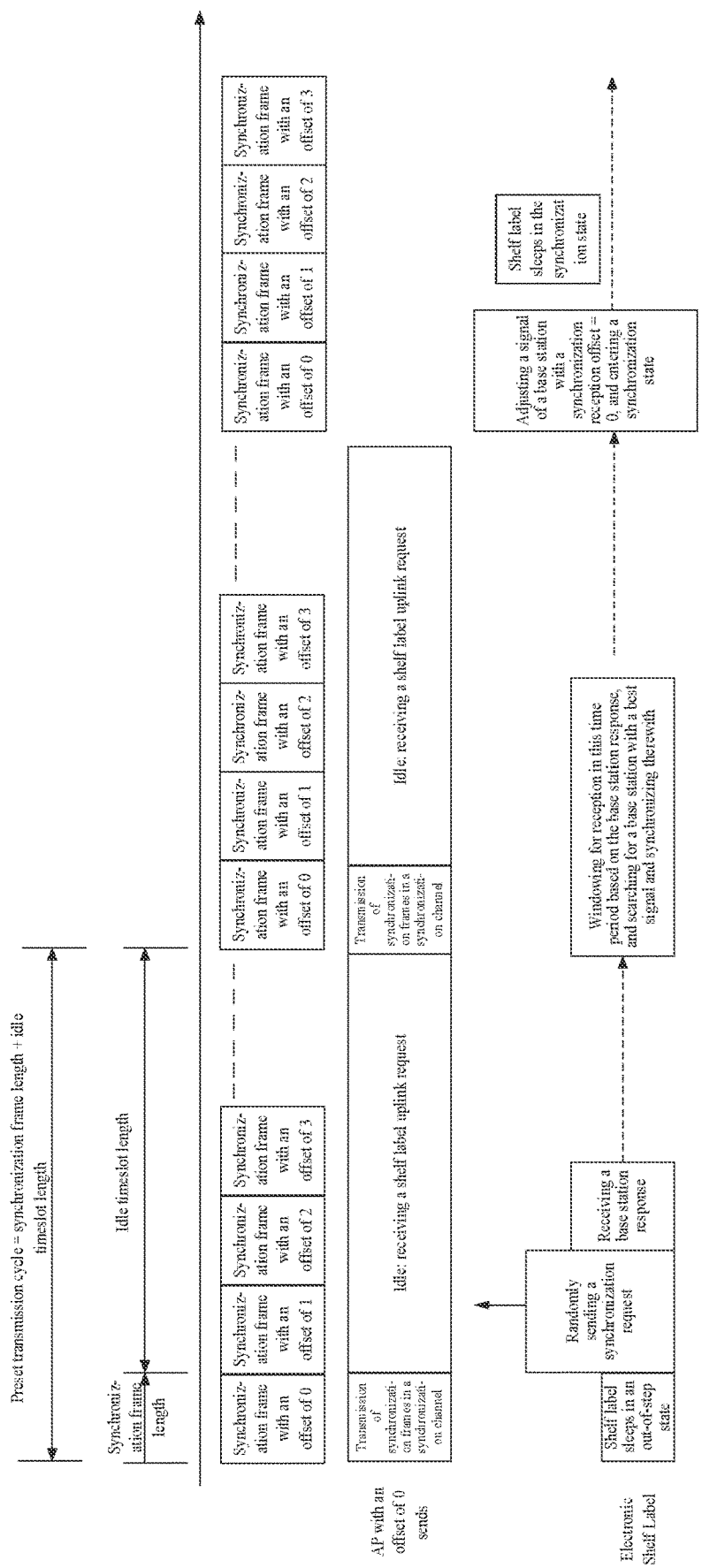
FIG. 6 illustrates a networking diagram of an electronic shelf label in an out-of-step state according to an embodiment of the present disclosure.

As illustrated in FIG. 6, in this embodiment, after each of the base stations calculates the idle time of the synchronization channel based on the synchronization frame transmission time, so that each of the base stations receives the target synchronization frame sent by the superior base station in the idle time of the synchronization channel, the method further includes: an electronic shelf label in an out-of-step state randomly sends a synchronization request in the synchronization channel, so that a base station that receives the synchronization request sends a synchronization response signal; the electronic shelf label in the out-of-step state calculates a windowing time period in which synchronization frames of all the base stations are received in the synchronization channel based on the synchronization response signal; the electronic shelf label in the out-of-step state obtains a synchronization base station based on signal intensities of all the synchronization frames received in the windowing time period, and enters a synchronization state based on a synchronization frame of the synchronization base station; and the synchronization base station may be a base station which receives a synchronization frame with a highest signal intensity, and when such base station cannot be registered successfully, other base station may be selected as the synchronization base station.

Further, the step that the electronic shelf label in the out-of-step state calculates the windowing time period in which synchronization frames of all the base stations are received in the synchronization channel based on the synchronization response signal includes: the electronic shelf label in the out-of-step state calculates a windowing start moment based on a time offset for a base station with an offset of n in the synchronization response signal from a next transmission of synchronization frames; the electronic shelflabel in the out-of-step state calculates a windowing end moment based on a maximum offset included in the synchronization response signal; and the electronic shelf label in the out-of-step state obtains a windowing time period in which synchronization frames of all the base stations are received in the synchronization channel based on the windowing start moment and the windowing end moment.

It should be noted that in the actual application scenarios of the electronic shelf label system, one or more electronic shelf labels may move or newly join the network, or automatically wake up too early or too late, which are collectively referred to as that the electronic shelf label is in the out-of-step state in this embodiment. As illustrated in FIG. 6, after each of the base stations calculates the idle time of the synchronization channel based on the synchronization frame transmission time, so that each of the base stations receives the target synchronization frame sent by the superior base station in the idle time of the synchronization channel, i.e., after all the base stations enter the synchronization state, the electronic shelf label that wakes up from the sleep state and is in the out-of-step state obtains the synchronization response signal of the base station by randomly sending an uplink synchronization request in the synchronization channel. The electronic shelf label obtains the windowing time period in which synchronization frames of all the base stations are received in the synchronization channel based on the offset of the base station in the synchronization response signal and the maximum offset in the synchronization network; receives the synchronization frames sent by all the base stations after waking up in the windowing time period; takes a base station with a highest signal intensity as the synchronization base station, and automatically wakes up when the synchronization base station sends a synchronization frame, thereby keeping synchronization with the synchronization base station.

In this embodiment, the electronic shelf label in the out-of-step state calculates the windowing start moment based on the time offset for the base station with an offset of n in the synchronization response signal from the next transmission of synchronization frames by the following calculation formula:

$$T_{k0}=(T_x+\text{offset})-n*t$$

where, $T_{k0}$ represents a windowing start moment, n represents an offset in the synchronization response signal, $T_x$ represents a moment of reception of the synchronization response signal by the electronic shelf label in the out-of-step state, offset represents a time offset in the synchronization response signal, ($T_x$+offset) represents a start moment of sending a synchronization frame by the base station with an offset of n, and/ represents a synchronization frame transmission duration.

In this embodiment, the electronic shelf label in the out-of-step state calculates the windowing end moment based on the maximum offset included in the synchronization response signal by the following calculation formula:

$$T_{k1}=(T_x+\text{offset})+(N-n)*t$$

where, $T_{k1}$ represents a windowing end moment, N represents a maximum offset in the synchronization sub-network where the base station with an offset of n is located, and n and N are positive integers greater than or equal to 0, n represents an offset in the synchronization response signal, $T_x$ represents a moment of reception of the synchronization response signal by the electronic shelf label in the out-of-step state, offset represents a time offset in the synchronization response signal, and t represents a synchronization frame transmission duration.

To be further noted, a process of searching for a synchronization frame with a strongest base station signal during the windowing time period may cost several predetermined signal transmission cycles to achieve a final determination, and only one windowing reception is illustrated in FIG. 6. In this example, it can be seen that because a plurality of base stations send synchronization frames in a same synchronization channel, and the synchronization frames of a same sub-network are as adjacent as possible, the shelf label may have an explicit windowing duration when searching for a strongest synchronization frame signal, without changing the receiving frequency, so the electronic shelf label in the out-of-step state may complete synchronization networking with a very low power consumption. Therefore, the electronic shelf label in this embodiment may find an optimal synchronization base station in a short time, and quickly achieve the synchronization with a low power consumption. Meanwhile, the electronic shelf label may be quickly switched to a new target base station with a low power consumption during the movement.

Embodiment 3

Figure 7:
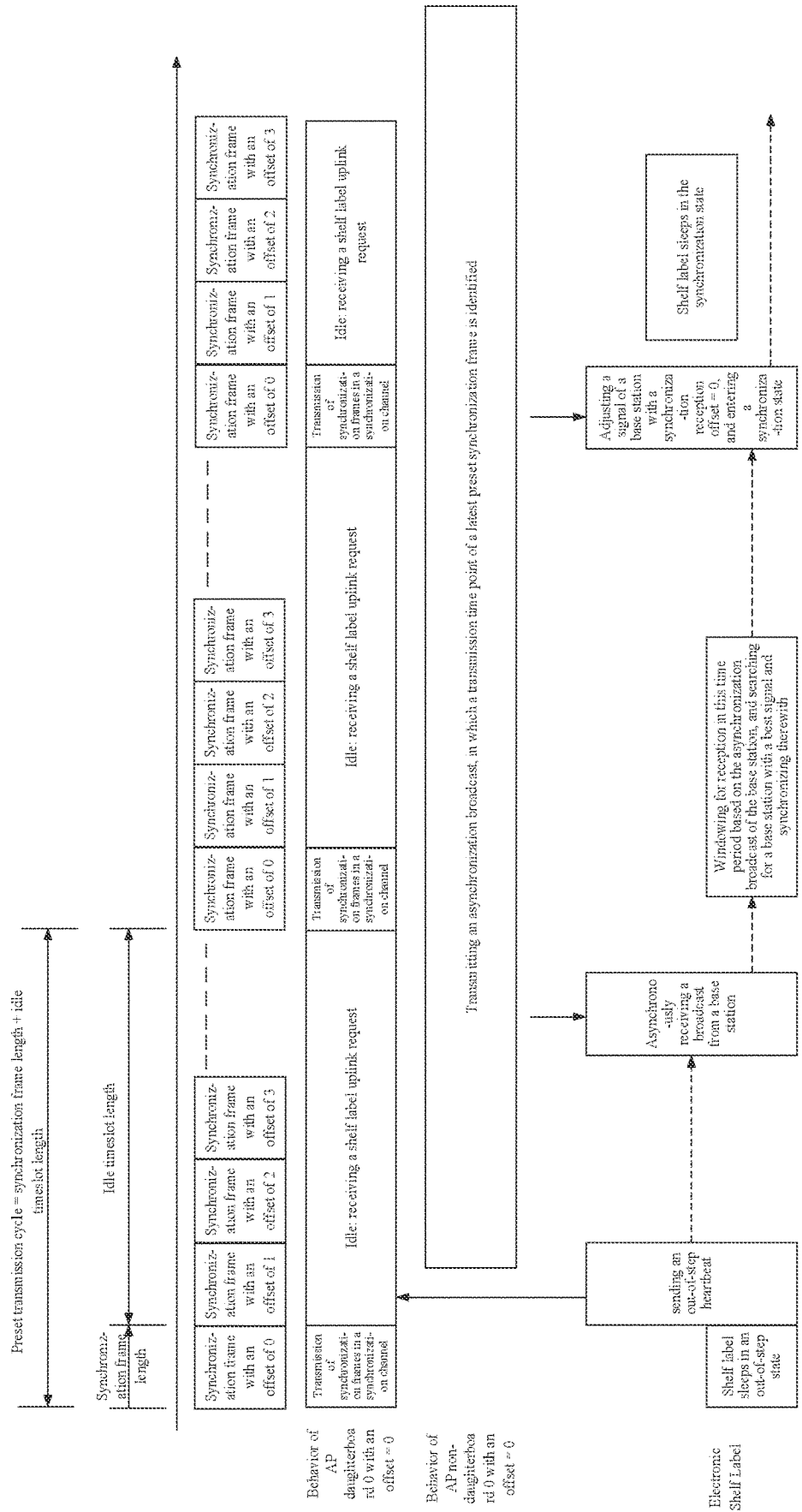
FIG. 7 illustrates a networking diagram of an electronic shelf label in an out-of-step state according to another embodiment of the present disclosure.

As illustrated in FIG. 7, in this embodiment, after each of the base stations calculates the idle time of the synchronization channel based on the synchronization frame transmission time, so that each of the base stations receives the target synchronization frame sent by the superior base station in the idle time of the synchronization channel, the method further includes: an electronic shelf label in the out-of-step state transmits an out-of-step heartbeat in the synchronization channel, so that at least one base station receiving the out-of-step heartbeat sends the out-of-step heartbeat and signal intensities of the received out-of-step heartbeat to the server; the server controls a first target base station which receives the out-of-step heartbeat with maximum signal intensity to transmit an asynchronization broadcast in an asynchronization channel; the electronic shelf label in the out-of-step state calculates a windowing time period in which synchronization frames of all the base stations are received in the synchronization channel based on an offset of a sending moment of synchronization frames in a latest predetermined signal transmission cycle included in the asynchronization broadcast; the electronic shelf label in the out-of-step state obtains a synchronization base station based on signal intensities of all the synchronization frames received in the windowing time period, and enters a synchronization state based on a synchronization frame of the synchronization base station; and the synchronization base station may be a base station which receives a synchronization frame with a highest signal intensity, and when such base station cannot be registered successfully, other base station may be selected as the synchronization base station.

It should be noted that the difference from Embodiment 2 is that after it is determined that all the base stations enter the synchronization state, a wireless network control center receives a heartbeat sent by a commodity shelf label, and may inform the base station to send a broadcast synchronization instruction in an asynchronization reception channel of the shelf label. The commodity shelf label asynchronously receives synchronization instruction sent by the base station, and the synchronization instruction indicate the position of the synchronization frame of the base station, so as to search for the synchronization frame by adjusting the signal reception time window thereof, and then enter the synchronization state.

In this embodiment, the base station may send signals on two daughter boards in different ways, and daughter board 0 keeps the cyclic transmission of synchronization signals, and receives the heartbeat sent by the shelf label and the signal such a synchronization request that may be sent by the shelf label; daughter board 1 or any other daughter board may send a broadcast message in the asynchronization reception channel of the shelf label as needed, so that the shelf label asynchronously receives a signal indicating a time position of the synchronization frame, thus completing the synchronization process. Because the base station sends a broadcast signal after receiving the heartbeat from just one shelf label, the broadcast signal may be received by all the shelf labels with the same asynchronization reception channel under the coverage of the base station, thereby realizing a rapid group synchronization process.

In this embodiment, the electronic shelf label is in a sleep state at the time other than that of receiving a synchronization frame, sending a synchronization request, receiving a synchronization response signal, receiving a data frame, sending an out-of-step heartbeat and receiving an asynchronization broadcast and a windowing time period. Therefore, it can be seen that the communication method of the electronic shelf label system according to the present disclosure enables the electronic shelf label in the out-of-step state to wake up in an explicit windowing time period for synchronization networking, thereby reducing the power consumption of the electronic shelf label as much as possible.

Embodiment 4

In this embodiment, the synchronization frame includes a synchronization frame number, an offset of the base station, an indication bit regarding whether there is a data frame in a current predetermined signal transmission cycle, a channel for transmitting the data frame in the current predetermined signal transmission cycle, and a packet sequence number in the synchronization frame.

In this embodiment, the method further includes: when a base station has a data frame to be sent in a next predetermined signal transmission cycle, the base station or the server selects a target channel from an idle data channel pool as a data channel for the base station to transmit the data frame; the target channel is configured in a transmission synchronization frame of the next predetermined signal transmission cycle, and a plurality of electronic shelf labels synchronized with the base station is enabled to receive the data frame in the target channel; and the base station releases the target channel into the idle data channel pool based on a transmission requirement of the data frame.

It should be noted that before each data frame is sent, there is an indication bit in the synchronization frame to indicate whether there is a subsequent data frame and a channel used by the subsequent data frame. Therefore, when there is no business data to be sent, it is indicated in the synchronization frame that there is no subsequent data in this frame, the electronic shelf label directly sleeps after receiving the synchronization frame, thereby further reducing the power consumption of the electronic shelf label.

When there is business data to be sent, it is indicated in the synchronization frame that there is subsequent data in this frame and which channel is used to transmit the data. After receiving the synchronization frame, the commodity shelf label continues to receive the subsequent data based on the indicated channel. Therefore, each of the base stations may use a different channel to work every time data is transmitted. When a plurality of base stations work in parallel, a channel allocation algorithm may be adopted for a reasonable allocation to obtain the channel for each work, so that the interference between the base stations may be avoided to a maximum extent and the degree of parallelism may be improved. In this embodiment, the base station determines whether to release the channel resources based on the transmission requirement of the data frame, and may continuously use a plurality of predetermined signal transmission cycles or release the channel resources after one cycle.

Embodiment 5

In this embodiment, the method further includes: a base station in an out-of-step state receives synchronization frames sent by other base stations in a same store within a time period exceeding the predetermined signal transmission cycle under the control of the server; the server obtains a target synchronization sub-network to be networked based on the signal intensities of all the synchronization frames received by the base station in the out-of-step state; the server allocates a target offset for the base station in the out-of-step state based on an idle offset in the target synchronization sub-network, and allocates a superior base station for the base station in the out-of-step state based on a network topological structure in the target synchronization sub-network; and the base station in the out-of-step state joins the target synchronization sub-network based on the target offset and a synchronization frame sent by the superior base station.

It should be noted that in this embodiment, the out-of-step state of the base station may mean that the base station moves or a new base station is added. Under the control of the server, the base station in the out-of-step state determined a target synchronization sub-network to be networked according to the signal intensities of all the synchronization frames received among those sent by other base stations of the same store in a duration exceeding a predetermined synchronization frame transmission cycle; and the number of the base stations in the target synchronization sub-network, which send the synchronization frames with intensities exceeding a preset threshold to be received by the base station in the out-of-step state, is the largest. Further, the server judges whether there is a first idle offset between 0 and the maximum offset in the target synchronization sub-network, and if so, allocates the first idle offset to the base station in the out-of-step state; or if not, judges whether the maximum offset is equal to the maximum capacity number minus 1. When the maximum offset is not equal to the maximum capacity number minus 1, a second idle offset obtained by adding the maximum offset with 1 is allocated to the base station in the out-of-step state; and when the maximum offset is equal to the maximum accommodation number minus 1, a synchronization sub-network with a second largest number of base stations where the intensities of the synchronization frames exceed the preset threshold is taken as a next target synchronization sub-network for the base station in the out-of-step state, and an offset is allocated to the base station in the out-of-step state in the synchronization sub-network based on the way of finding the idle offset. In this embodiment, if the base station in the out-of-step state does not receive a synchronization signal from any other base station in the same store, it means that there is only one base station in the store. At this time, the server controls the base station to become a master base station and directly send the synchronization frame signal and enter the synchronization state. In addition, when all the base stations are in the out-of-step state, an initial synchronization network may be established by referring to the technical solutions disclosed in the patent CN110602660B titled as "method, apparatus and device, and storage medium for ESLS-based synchronization network construction".

Further, a superior base station and/or a subordinate base station is allocated for the base station in the out-of-step state based on the network topological structure of the target synchronization sub-network, so that the local time is adjusted based on the synchronization frame sent by the superior base station, and the local synchronization frame transmission time is obtained based on the target offset, so that the base station in the out-of-step state may complete the synchronous networking and keep synchronization with the superior base station.

In a second aspect, the present disclosure provides an electronic shelf label system, including a server, a plurality of base stations and a plurality of electronic shelf labels;
  the server is configured to determine a maximum capacity number of base stations in each of synchronization sub-networks based on a predetermined signal transmission cycle and a synchronization frame transmission duration;
  the server is configured to construct at least one synchronization sub-network including the plurality of base stations based on a network topological structure between the base stations and the maximum capacity number of base stations;
  the server is configured to configure an offset of each of the base stations in the corresponding synchronization sub-network based on neighboring relationships between all the base stations in each of the synchronization sub-networks, so that each of the base stations calculates synchronization frame transmission time in the predetermined signal transmission cycle based on the offset, and a start moment of sending a synchronization frame by a base station with an offset of i is an end moment of sending a synchronization frame by a base station with an offset of i−1 in a same synchronization sub-network, and a maximum offset in the same synchronization sub-network is a sum of the number of actual base stations and M;
  each of the base stations is configured to calculate idle time in a synchronization channel based on the synchronization frame transmission time, so that each of the base stations receives a target synchronization frame sent by a superior base station in the idle time of the synchronization channel, and each of the base stations is configured to adjust local synchronization frame transmission time thereof based on a time offset of the target synchronization frame, and each of the base stations has the idle time in the synchronization channel and data frame transmission time in a data channel overlap with each other.

In this embodiment, the electronic shelf label is configured to wake up in a frame listening cycle to receive a synchronization frame sent by a synchronization base station, and adjust local time based on the synchronization frame.

In a third aspect, an embodiment of the present disclosure provides a computer device, including a memory, a processor and a computer program stored in the memory and executable on the processor, and when executing the computer program, the processor implements the following steps: a server determines a maximum capacity number of base stations in each of synchronization sub-networks, based on a predetermined signal transmission cycle and a synchronization frame transmission duration; the server constructs at least one synchronization sub-network including the plurality of base stations based on a network topological structure between the base stations and the maximum capacity number of base stations; the server configures an offset of each of the base stations in the corresponding synchronization sub-network based on neighboring relationships between all the base stations in each of the synchronization sub-networks, so that each of the base stations calculates synchronization frame transmission time in the predetermined signal transmission cycle based on the offset, and a start moment of sending a synchronization frame by a base station with an offset of i is an end moment of sending a synchronization frame by a base station with an offset of i−1 in a same synchronization sub-network, and a maximum offset in the same synchronization sub-network is a sum of the number of actual base stations and M; each of the base stations calculates idle time of a synchronization channel based on the synchronization frame transmission time, so that each of the base stations receives a target synchronization frame sent by a superior base station in the idle time of the synchronization channel, and each of the base stations adjusts local synchronization frame transmission time thereof based on a time offset of the target synchronization frame, and each of the base stations has the idle time in the synchronization channel and data frame transmission time in a data channel overlap with each other.

In a fourth aspect, an embodiment of the present disclosure provides a readable storage medium on which a computer program is stored, and when being executed by a processor, the computer program implements the following steps: a server determines a maximum capacity number of base stations in each of synchronization sub-networks, based on a predetermined signal transmission cycle and a synchronization frame transmission duration; the server constructs at least one synchronization sub-network including the plurality of base stations based on a network topological structure between the base stations the maximum capacity number of base stations; the server configures an offset of each of the base stations in the corresponding synchronization sub-network based on neighboring relationships between all the base stations in each of the synchronization sub-networks, so that each of the base stations calculates synchronization frame transmission time in the predetermined signal transmission cycle based on the offset, and a start moment of sending a synchronization frame by a base station with an offset of i is an end moment of sending a synchronization frame by a base station with an offset of i−1 in a same synchronization sub-network, and a maximum offset in the same synchronization sub-network is a sum of the number of actual base stations and M; each of the base stations calculates idle time of a synchronization channel based on the synchronization frame transmission time, so that each of the base stations receives a target synchronization frame sent by a superior base station in the idle time of the synchronization channel, and each of the base stations adjusts local synchronization frame transmission time thereof based on a time offset of the target synchronization frame, and each of the base stations has the idle time in the synchronization channel and data frame transmission time in a data channel overlap with each other.

Those skilled in the art can understand that all or part of the procedures in the methods of the above embodiments may be implemented by instructing related hardware via a computer program, and the program may be stored in a nonvolatile computer-readable storage medium. When being executed, the program may include procedures in the methods of the above embodiments. In this embodiment, any reference to a memory, a storage, a database or other media used in the embodiments of the present disclosure may include a non-volatile and/or a volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random-access memory (RAM) or an external cache memory. By way of illustration rather than limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), a Rambus direct RAM (RDRAM), a direct memory bus dynamic RAM (DRDRAM), a memory bus dynamic RAM (RDRAM), etc.

It should be noted that herein relational terms such as "first" and "second" are only used to distinguish one entity or operation from another entity or operation, and do not necessarily require or imply that any such actual relationship or order is existed between the entities or operations. Moreover, the terms "comprise", "include" and any other variation thereof are intended to cover non-exclusive inclusions, so that a process, a method, an article or a device including a series of elements includes not only those elements, but also other elements not explicitly listed or elements inherent to the process, the method, the article or the device. Without further limitations, an element defined by a phrase "comprising a . . . " does not exclude the existence of other identical elements in a process, a method, an article or a device including the element.

What is claimed is:

1. A communication method of an electronic shelf label system comprising a server, a plurality of base stations and a plurality of electronic shelf labels, and the method comprising:

determining, by the server, a maximum capacity number of base stations in each of synchronization sub-networks, based on a predetermined signal transmission cycle and a synchronization frame transmission duration;

constructing, by the server, at least one synchronization sub-network comprising the plurality of base stations, based on the maximum capacity number of base stations and a network topological structure between the base stations;

configuring, by the server, an offset of each of the base stations in the corresponding synchronization sub-network based on neighboring relationships between all the base stations in each of the synchronization sub-networks, so that each of the base stations calculates synchronization frame transmission time in the predetermined signal transmission cycle based on the offset, wherein a start moment of sending a synchronization frame by a base station with an offset of i in a same synchronization sub-network is an end moment of sending a synchronization frame by a base station with an offset of i−1, and a maximum offset in the same synchronization sub-network is a sum of the number of actual base stations and M; and calculating, by each of the base stations, idle time in a synchronization channel, based on the synchronization frame transmission time, so that each of the base stations receives a target synchronization frame sent by a superior base station in the idle time of the synchronization channel, and each of the base stations adjusts local synchronization frame transmission time thereof based on a time offset of the target synchronization frame, wherein each of the base stations has the idle time in the synchronization channel and data frame transmission time in a data channel overlap with each other.

2. The communication method of the electronic shelf label system according to claim 1, wherein after calculating, by each of the base stations, idle time in a synchronization channel, based on the synchronization frame transmission time, so that each of the base stations receives a target synchronization frame sent by a superior base station in the idle time of the synchronization channel, the method further comprises:

randomly sending, by an electronic shelf label in an out-of-step state, a synchronization request in the synchronization channel, so that a base station that receives the synchronization request sends a synchronization response signal;

calculating, by the electronic shelf label in the out-of-step state, a windowing time period in which synchronization frames of all the base stations are received in the synchronization channel, based on the synchronization response signal; and obtaining, by the electronic shelf label in the out-of-step state, a synchronization base station, based on signal intensities of all the synchronization frames received in the windowing time period; and entering a synchronization state, based on a synchronization frame of the synchronization base station.

3. The communication method of the electronic shelf label system according to claim 2, wherein calculating, by the electronic shelf label in the out-of-step state, a windowing time period in which synchronization frames of all the base stations are received in the synchronization channel, based on the synchronization response signal comprises:

calculating, by the electronic shelf label in the out-of-step state, a windowing start moment, based on a time offset for a base station with an offset of n in the synchronization response signal from a next transmission of synchronization frames;

calculating, by the electronic shelf label in the out-of-step state, a windowing end moment, based on a maximum offset included in the synchronization response signal; and obtaining, by the electronic shelf label in the out-of-step state, a windowing time period in which synchronization frames of all the base stations are received in the synchronization channel, based on the windowing start moment and the windowing end moment.

4. The communication method of the electronic shelf label system according to claim 3, wherein calculating, by the electronic shelf label in the out-of-step state, a windowing start moment, based on a time offset for a base station with an offset of n in the synchronization response signal from a next transmission of synchronization frames comprises a calculation formula configured to calculate the windowing start moment:

$$T_{k0}=(T_x+\text{offset})-n*t$$

where, $T_{k0}$ represents a windowing start moment, n represents an offset in the synchronization response signal, $T_x$ represents a moment of reception of the synchronization response signal by the electronic shelf label in the out-of-step state, offset represents a time offset in the synchronization response signal, ($T_x$+offset) represents a start moment of sending a synchronization frame by the base station with an offset of n, and t represents a synchronization frame transmission duration.

5. The communication method of the electronic shelf label system according to claim 3, wherein calculating, by the electronic shelf label in the out-of-step state, a windowing end moment, based on a maximum offset included in the synchronization response signal comprises a calculation formula configured to calculate the windowing start moment:

$$T_{k1}=(T_x+\text{offset})+(N-n)*t$$

where, $T_{k1}$ represents a windowing end moment, N represents a maximum offset in the synchronization sub-network where the base station with an offset of n is located, n represents an offset in the synchronization response signal, $T_x$ represents a moment of reception of the synchronization response signal by the electronic shelf label in the out-of-step state, offset represents a time offset in the synchronization response signal, and t represents a synchronization frame transmission duration.

6. The communication method of the electronic shelf label system according to claim 1, wherein after calculating, by each of the base stations, idle time in a synchronization channel, based on the synchronization frame transmission time, so that each of the base stations receives a target synchronization frame sent by a superior base station in the idle time of the synchronization channel, the method further comprises:

transmitting, by an electronic shelf label in an out-of-step state, an out-of-step heartbeat in the synchronization channel, so that at least one base station receiving the out-of-step heartbeat sends the out-of-step heartbeat and signal intensities of the received out-of-step heartbeat to the server;

controlling, by the server, a first target base station which receives the out-of-step heartbeat with maximum signal intensity to transmit an asynchronization broadcast in an asynchronization channel;

calculating, by the electronic shelf label in the out-of-step state, a windowing time period in which synchronization frames of all the base stations are received in the synchronization channel, based on an offset of sending moment of synchronization frames in a latest predetermined signal transmission cycle included in the asynchronization broadcast; and obtaining, by the electronic shelf label in the out-of-step state, a synchronization base station, based on signal intensities of all the synchronization frames received in the windowing time period; and entering a synchronization state, based on a synchronization frame of the synchronization base station.

7. The communication method of the electronic shelf label system according to claim 1, wherein the electronic shelf label is in a sleep state at the time other than that of receiving a synchronization frame, sending a synchronization request, receiving a synchronization response signal, receiving a data frame, sending an out-of-step heartbeat and receiving an asynchronization broadcast and a windowing time period.

8. The communication method of the electronic shelf label system according to claim 2, wherein the electronic shelf label is in a sleep state at the time other than that of receiving a synchronization frame, sending a synchronization request, receiving a synchronization response signal, receiving a data frame, sending an out-of-step heartbeat and receiving an asynchronization broadcast and a windowing time period.

9. The communication method of the electronic shelf label system according to claim 6, wherein the electronic shelf label is in a sleep state at the time other than that of receiving a synchronization frame, sending a synchronization request, receiving a synchronization response signal, receiving a data frame, sending an out-of-step heartbeat and receiving an asynchronization broadcast and a windowing time period.

10. The communication method of the electronic shelf label system according to claim 1, wherein the synchronization frame comprises a synchronization frame number, an offset of the base station, an indication bit regarding whether there is a data frame in a current predetermined signal transmission cycle, a channel for transmitting the data frame in the current predetermined signal transmission cycle, and a packet sequence number in the synchronization frame.

11. The communication method of the electronic shelf label system according to claim 2, wherein the synchronization frame comprises a synchronization frame number, an offset of the base station, an indication bit regarding whether there is a data frame in a current predetermined signal transmission cycle, a channel for transmitting the data frame in the current predetermined signal transmission cycle, and a packet sequence number in the synchronization frame.

12. The communication method of the electronic shelf label system according to claim 6, wherein the synchronization frame comprises a synchronization frame number, an offset of the base station, an indication bit regarding whether there is a data frame in a current predetermined signal transmission cycle, a channel for transmitting the data frame in the current predetermined signal transmission cycle, and a packet sequence number in the synchronization frame.

13. The communication method of the electronic shelf label system according to claim 10, further comprising:
when a base station has a data frame to be sent in a next predetermined signal transmission cycle, selecting, by the base station or the server, a target channel from an idle data channel pool as a data channel for the base station to transmit the data frame;
configuring the target channel in a transmission synchronization frame of the next predetermined signal transmission cycle, and enabling a plurality of electronic shelf labels synchronized with the base station to receive the data frame in the target channel; and
releasing, by the base station, the target channel into the idle data channel pool, based on a transmission requirement of the data frame.

14. The communication method of the electronic shelf label system according to claim 1, wherein after calculating, by each of the base stations, idle time in a synchronization channel, based on the synchronization frame transmission time, the method further comprises:
receiving, by a base station in an out-of-step state, synchronization frames sent by other base stations in a same store within a time period exceeding the predetermined signal transmission cycle under the control of the server;
obtaining, by the server, a target synchronization sub-network to be networked, based on signal intensities of all the synchronization frames received by the base station in the out-of-step state, wherein the number of the base stations in the target synchronization sub-network, which send synchronization frames with intensities exceeding a preset threshold to be received by the base station in the out-of-step state, is the largest;
allocating, by the server, a target offset for the base station in the out-of-step state based on an idle offset in the target synchronization sub-network, and allocating a superior base station for the base station in the out-of-step state based on a network topological structure in the target synchronization sub-network; and
joining, by the base station in the out-of-step state, the target synchronization sub-network, based on the target offset and a synchronization frame sent by the superior base station.

15. The communication method of the electronic shelf label system according to claim 14, wherein allocating, by the server, a target offset for the base station in the out-of-step state based on an idle offset in the target synchronization sub-network comprises:
judging, by the server, whether there is a first idle offset between a minimum offset and a maximum offset in the target synchronization sub-network, and
when there is a first idle offset, allocating the first idle offset to the base station in the out-of-step state.

16. The communication method of the electronic shelf label system according to claim 15, wherein further comprises:
when there is no first idle offset, judging whether the maximum offset is equal to the maximum capacity number minus 1; and when the maximum offset is not equal to the maximum capacity number minus 1, allocating a second idle offset obtained by adding the maximum offset with 1 to the base station in the out-of-step state.

17. An electronic shelf label system, comprising a server, a plurality of base stations and a plurality of electronic shelf labels;
the server is configured to determine a maximum capacity number of base stations in each of synchronization sub-networks based on a predetermined signal transmission cycle and a synchronization frame transmission duration;
the server is configured to construct at least one synchronization sub-network comprising the plurality of base stations, based on the maximum capacity number of base stations and a network topological structure between the base stations;
the server is configured to configure an offset of each of the base stations in the corresponding synchronization sub-network based on neighboring relationships between all the base stations in each of the synchronization sub-networks, so that each of the base stations calculates synchronization frame transmission time in the predetermined signal transmission cycle based on the offset, wherein a start moment of sending a synchronization frame by a base station with an offset of i in a same synchronization sub-network is an end moment of sending a synchronization frame by a base station with an offset of i−1, and a maximum offset in the same synchronization sub-network is a sum of the number of actual base stations and M; and
each of the base stations is configured to calculate idle time in a synchronization channel based on the synchronization frame transmission time, so that each of the base stations receives a target synchronization frame sent by a superior base station in the idle time of the synchronization channel, and each of the base stations is configured to adjust local synchronization frame transmission time thereof based on a time offset of the target synchronization frame, wherein each of the base stations has the idle time in the synchronization channel and data frame transmission time in a data channel overlap with each other.

18. The electronic shelf label system according to claim 17, wherein the electronic shelf label is configured to wake up in a frame listening cycle to receive a synchronization frame sent by a synchronization base station, and adjust local time based on the synchronization frame.

19. A computer device, comprising a memory, a processor and a computer program stored in the memory and executable on the processor, wherein when executing the computer program, the processor implements the method according to claim 1.

20. The computer device according to claim 19, wherein when executing the computer program, the processor implements the method comprising:
randomly sending, by an electronic shelf label in an out-of-step state, a synchronization request in the synchronization channel, so that a base station that receives the synchronization request sends a synchronization response signal;
calculating, by the electronic shelf label in the out-of-step state, a windowing time period in which synchronization frames of all the base stations are received in the synchronization channel, based on the synchronization response signal; and obtaining, by the electronic shelf label in the out-of-step state, a synchronization base station, based on signal intensities of all the synchronization frames received in the windowing time period;

and entering a synchronization state, based on a synchronization frame of the synchronization base station.

\* \* \* \* \*